Aug. 30, 1960        D. RUBENSTEIN        2,950,576
SHOCK ABSORBING CONNECTIONS FOR BUILDING CONSTRUCTIONS
Filed April 25, 1956        7 Sheets-Sheet 1

INVENTOR.
BY David Rubenstein

Attorneys

Aug. 30, 1960  D. RUBENSTEIN  2,950,576
SHOCK ABSORBING CONNECTIONS FOR BUILDING CONSTRUCTIONS
Filed April 25, 1956  7 Sheets-Sheet 2
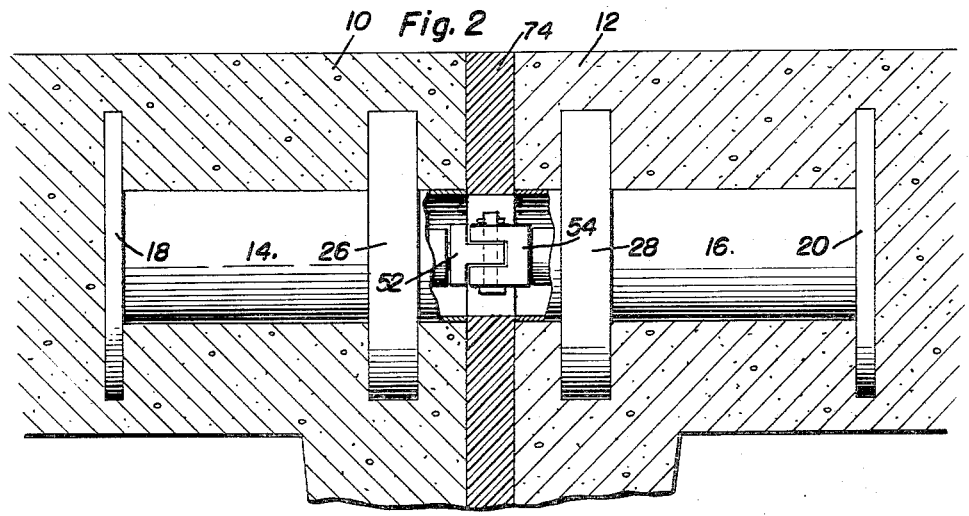
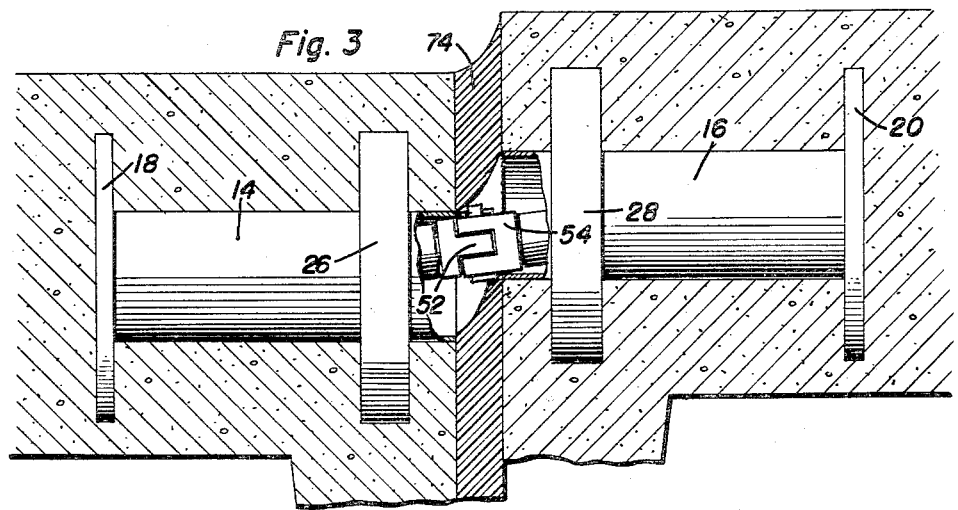
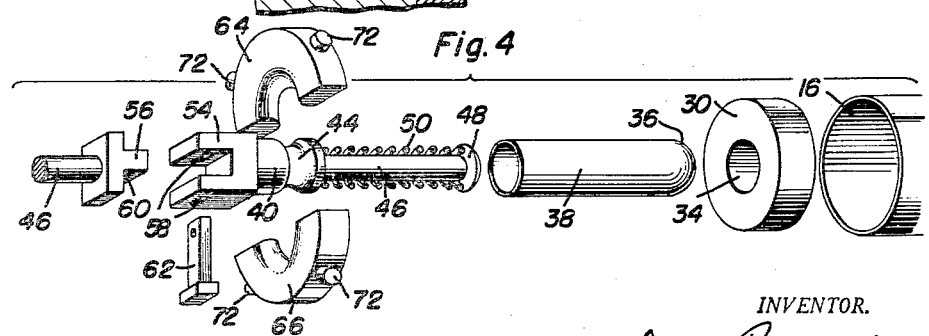
INVENTOR.
BY David Rubenstein
Attorneys

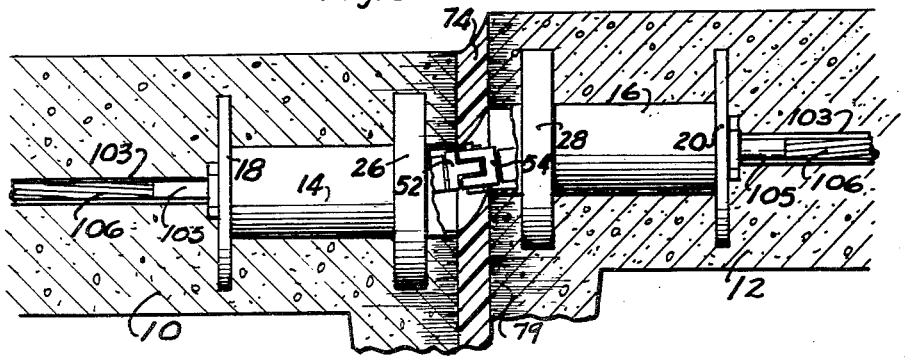
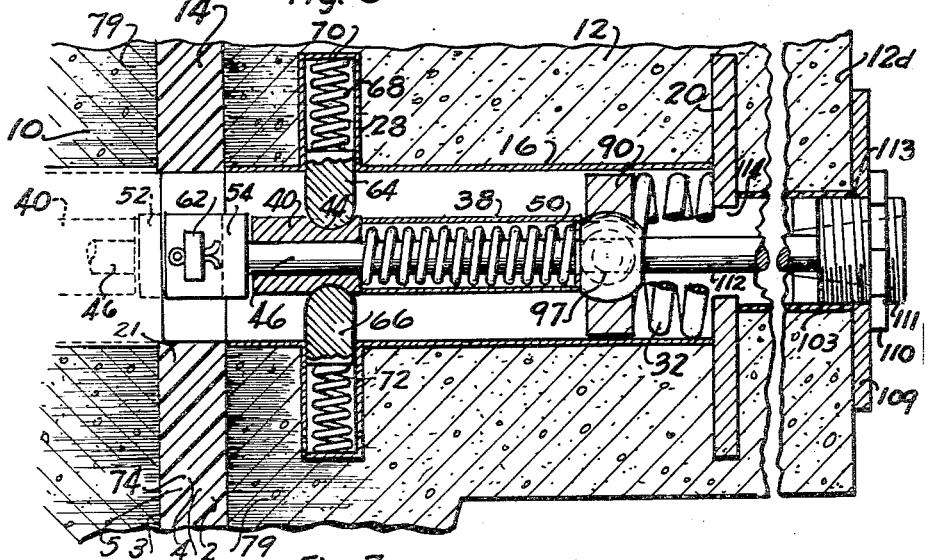
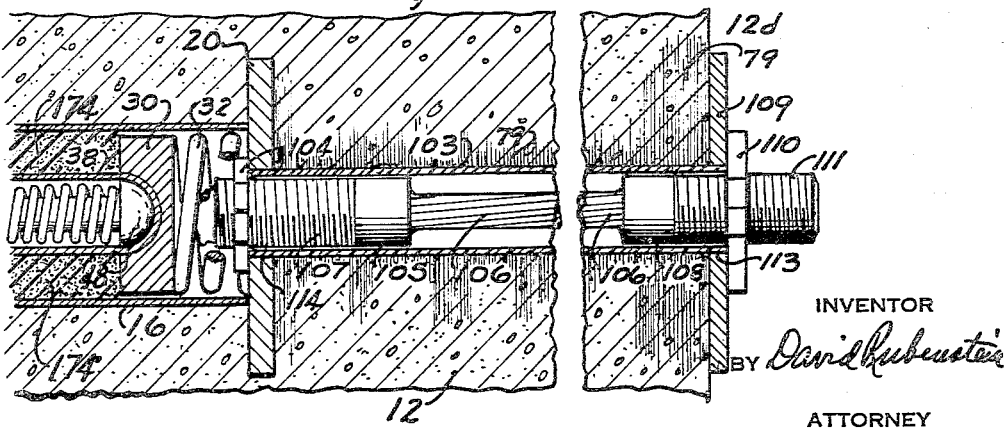

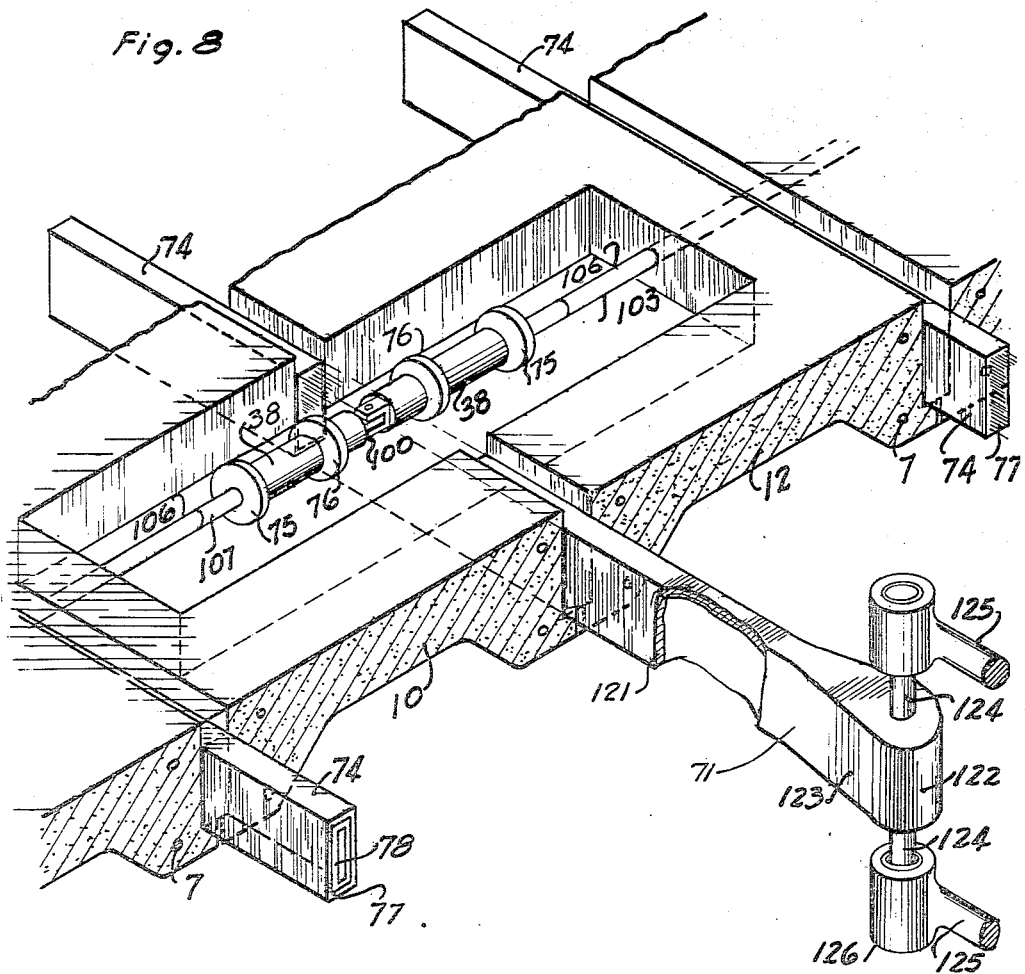
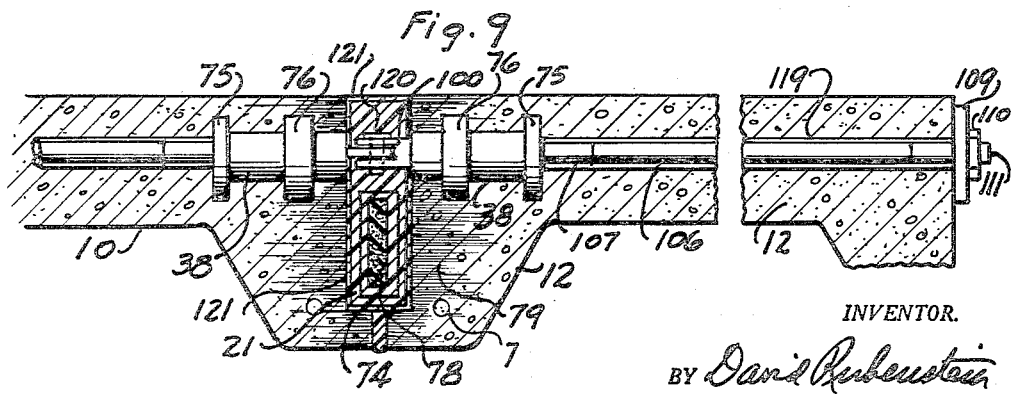

Aug. 30, 1960     D. RUBENSTEIN     2,950,576
SHOCK ABSORBING CONNECTIONS FOR BUILDING CONSTRUCTIONS
Filed April 25, 1956     7 Sheets-Sheet 5
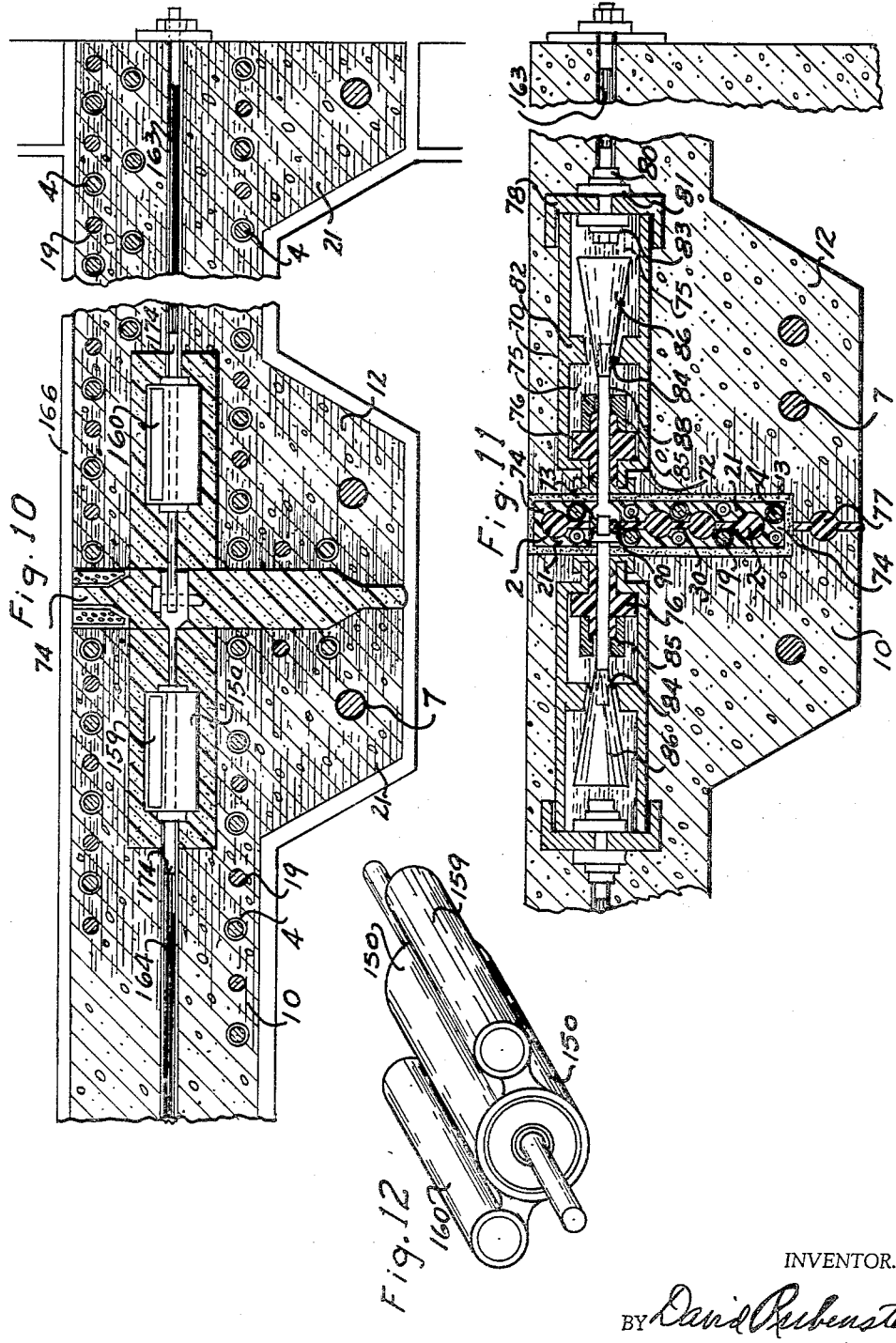
INVENTOR.
BY David Rubenstein

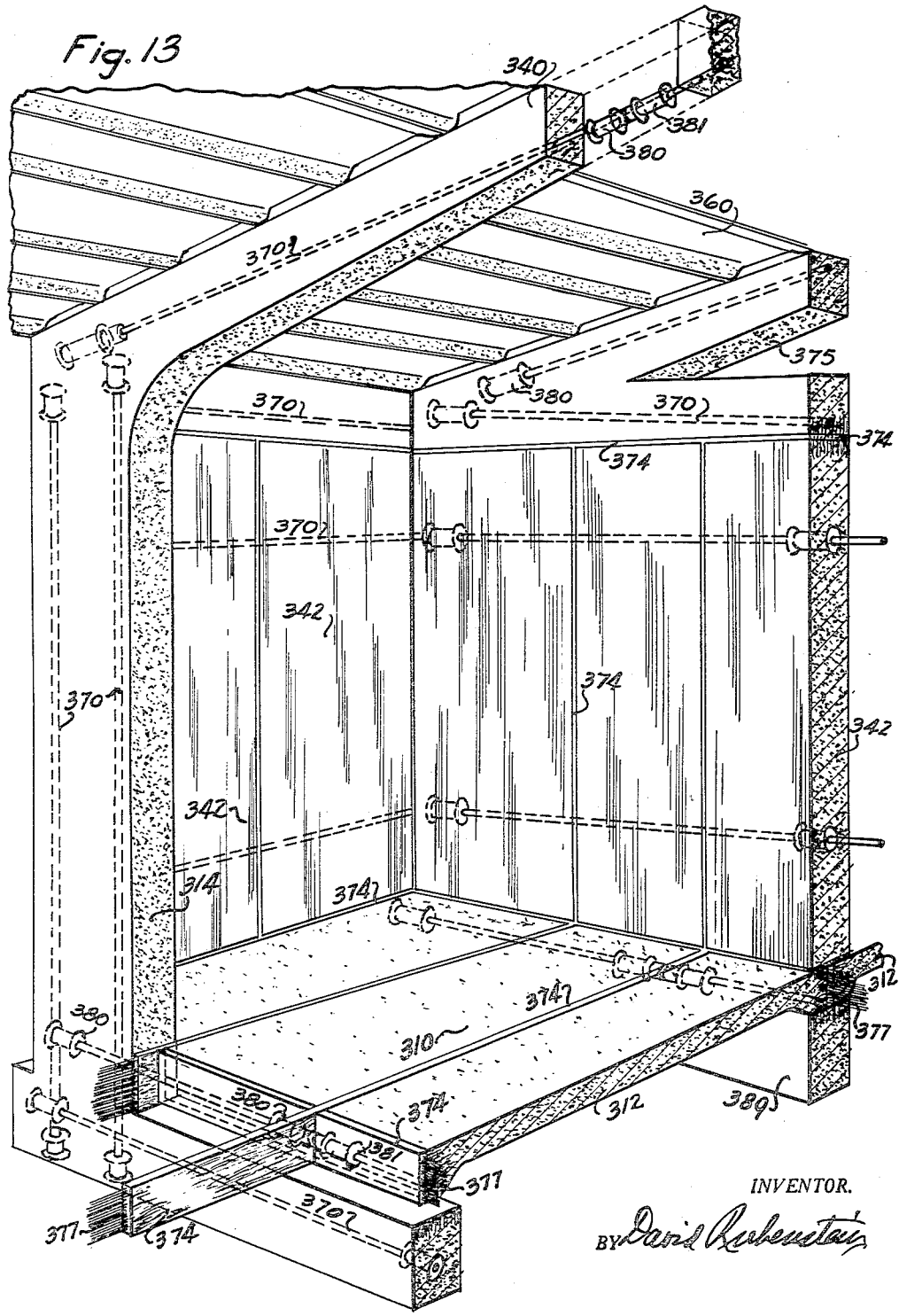

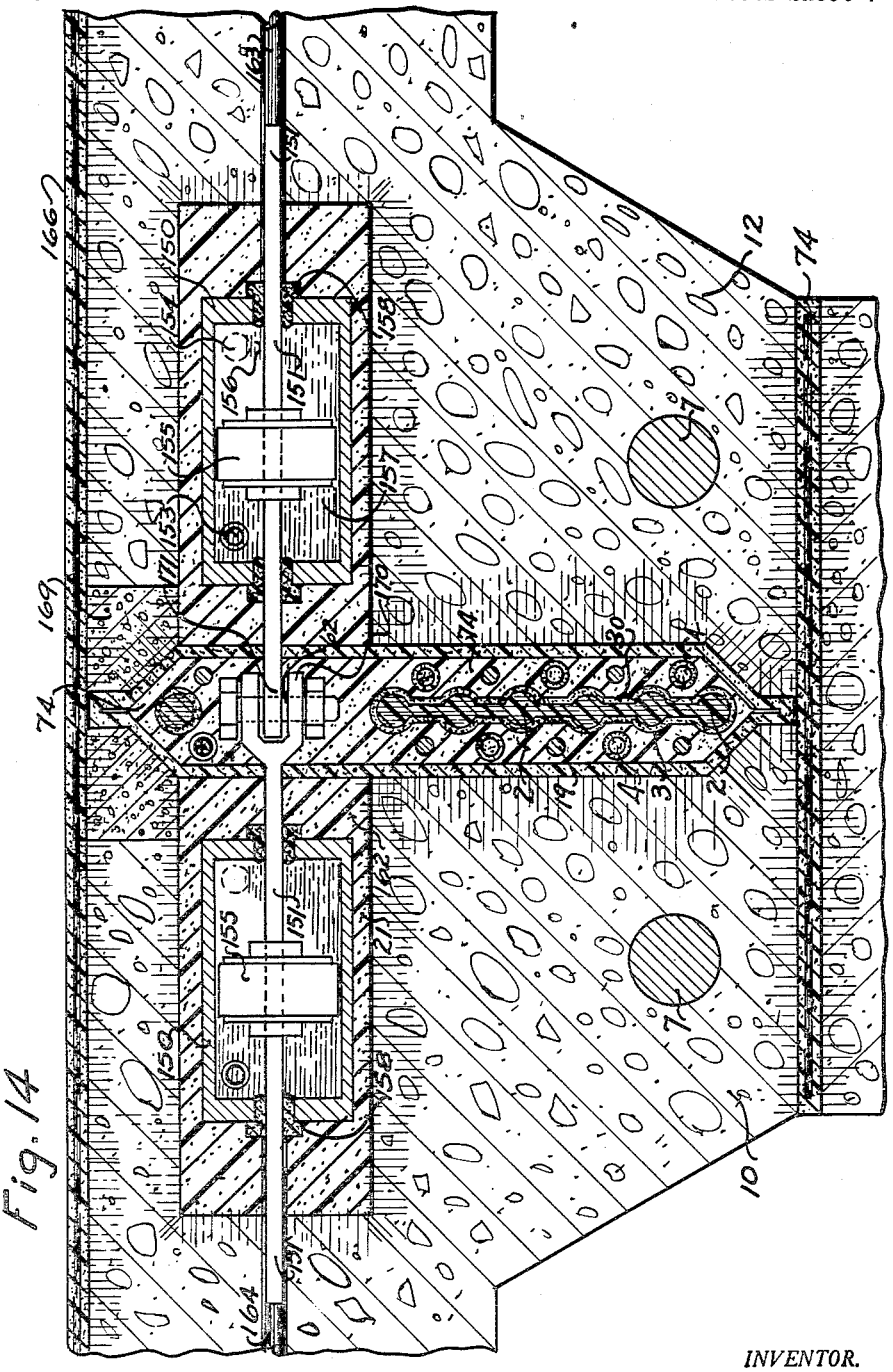

2,950,576

SHOCK ABSORBING CONNECTIONS FOR
BUILDING CONSTRUCTIONS

David Rubenstein, 2750 2nd Ave., San Diego 3, Calif.

Filed Apr. 25, 1956, Ser. No. 582,614

13 Claims. (Cl. 50—128)

This invention relates to joints for structural members and more particularly to joints for building blocks, precast concrete panels, precast concrete shapes, precast-prestressed concrete panels, girders, beams, supports, walls, slabs, structural elements and the like.

This invention is a continuation-in-part to my application Serial No. 211,011, filed February 14, 1951. (The specification for application Serial No. 211,011 is now abandoned in favor of the present application but the invention disclosed therein is not abandoned and is claimed herein.)

The primary purpose of this invention is to provide an improved shock absorbing joint construction of general application wherever two relatively movable members are to be secured to each other and specifically applicable to the joints of masonry constructions of any material and especially of masonry constructions of the precast concrete and prestressed concrete types, and particularly wherein the joint and joinery provides structural engineering multi-functional uses, wherein the materials joined and the materials of the joint and joinery as an assembly and combination of or integration of materials of construction are prestressed into a pre-loaded state by mechanically induced forces, thermally induced forces or physio-chemically induced forces used alone or together of either of them.

A very important object of this invention is to provide shock absorbing connectors and shock absorbing connections in combination with resilient bonding layers having either single or multi-functional uses in joints and in joinery of the character set forth herein which shall be of simple and inexpensive construction, easily installed in conventional building, structural engineering, highway, and bridge, and other constructions; and shall be capable of both unidirectionally and multi-directionally resiliently but securely fastening two or more members together, while permitting, although yieldingly resisting, relative movements of the two or more members in all directions.

Still another object of the invention is to provide shock absorbing connectors and shock absorbing connections and joinery construction incorporating the same therein which shall be exceptionally sturdy and durable when the normal static load is applied to the joint and joinery construction; and which shall be capable of absorbing shocks, from whatever direction the same may originate, without damage to the connector or connections, or to the joint and joinery construction.

A still further object of the invention is to provide an improved bonding connection between adjacent elements to maintain fixed and rigid position under normal loads and yet be capable of resiliently and yieldingly resisting the imposition of overloads upon the joint.

Another important object of the invention is to provide structural joinery by the use of prestressing cables, rods, wires, belts or laminations whether of metallic or nonmetallic materials, wherein tying by compression means the several components of any structure is provided; and in which the joints and the joinery are both articulative and load bearing and provide inherently in the prestressing materials substantial means for dissipating impact-impulse loadings placed upon the structure when the structure is in use in a prestressed pre-loaded condition.

Yet another object of the invention is to provide a shock absorbing connector for use in joints of building constructions which shall securely fasten the members forming the joint and the joinery, and yet connect the same for swivelling and articulative movement in any direction; said movement to be in the materials within the elastic limits thereof and on occasion, by plastic yielding beyond the elastic limit of some of the materials, particularly those materials of the construction which have a plastic memory for return to original state after being stressed.

A still further object of the invention is to provide constructions which are characterized by articulative and articulated and shock-resisting flexible joints especially adapted for rendering fabricated structures bomb-proof and shock-proof in a substantial manner and, in particular, those structures of the prefabricated concrete type which are made from precast structural elements which are either prestressed by post-tensioning or pretensioning means or a combination thereof.

Another object of the invention is to provide joinery in combination with prestressing means for an improved construction useful as garage construction, shelter construction, warehouse construction, hospital construction, industrial and factory construction and military constructions which shall be especially shock resistant to earthquakes, tornados, hurricanes and dynamic loadings, and the like, and which shall be ideally adapted for partial or complete subterranean construction.

A further object of the invention is to provide a construction which shall be capable of distributing the impacts of shocks throughout the structure while dampening and absorbing the energy thereof and dissipating this energy in the form of work and heat at the articulated resilient joints of the structure.

Another object of the invention is to so improve concrete as a material and the like, at and to designed distances back from the face of any joint to give it new properties such as tensile strength over and above the properties existing in the concrete as cured concrete prior to use in my invention.

The materials and techniques used to form and make the high strength integration of the blocks and concrete elements in a prestressed state in my present invention are advantageously as set forth in my prior applications, and particularly as advantageously set forth in my prior copending applications Serial No. 498,715 and Serial No. 558,734; but whereas the first is concerned broadly with surface laminates and specifically with blocks for building into structures, and the second is concerned broadly with articulative building structures and especially with such structures wherein the blocks and the joints sandwiched between them mutually serve and protect each other, my present invention is concerned broadly with shock absorbing connectors and connections and prestressed improvements, and especially with such structures wherein the combination of elements and materials provide prestressed articulative and articulated joints and joinery constructions having shock absorbing connections and prestressed construction features.

For the purposes of clarity of expression and understanding in the present application of invention, the use of prestressing by various techniques require definition of types and methods of prestressing considered and used in this invention.

In the present invention the new and novel joinery and joint constructions achieved are made with forces and features derived from mechanical, thermal and physiochemical prestressing techniques in which said techniques may be used alone in any given application or together of either of them.

Mechanical prestressing is defined herein as the application of pressure by mechanical devices such as hydraulic prestressing jacks made up of a ram powered by a hydraulic pump with which to build up force for prestressing tendons in tensile loading or concrete in compression loading, or if desired, both tensile and compression loading simultaneously as is shown in my copending application Serial No. 345,084. Heat can in and of itself provide all the needed prestressing forces of preload in certain constructions.

Chemical prestressing is defined at times in my applications as "chemical prestressing" and at times as "physio-chemical" prestressing. In this application the terms are interchangeable. A chemical reaction which causes heat or in which expansion or shrinkage occurs provides both chemical and physical change in certain materials of this invention. A chemical reaction which causes cold and which provides forces which can be captured as preload are considered as equivalent as prestressing means. Physio-chemical or simple chemical prestressing is defined therefore, as prestressing derivation of and capture of forces from chemical reactions which induce a change of system of matter or change of state and/or volume of one material or of combinations of materials, said change including preload of forces in the material or materials affected. Means of physio-chemical and simple chemical prestressing are shown in my copending applications and particularly in my copending applications Serial No. 229,852 filed June 4, 1951 and a portion of which is now Patent No. 2,850,890, Serial No. 498,715 filed April 1, 1955, Serial No. 340,642 filed January 16, 1953, Serial No. 345,084 filed March 27, 1953, Serial No. 542,648 filed October 25, 1955, now Patent No. 2,787,748, and Serial No. 558,734 filed January 12, 1956, and to which applications, this application is a continuation-in-part.

The features claimed in the present invention are useful and cooperative with features claimed in the above copending applications and my Patent No. 2,671,158.

The embodiments and examples of the present invention are in part substantially identical with those given in the above patent applications and are companion cases that cover related but distinct inventions. It will be understood by those versed in patent law and practice that this is because these practical articles and methods embody several inventions, each or some of which can be used with or without the others, i.e., some of the inventions thus used together may be considered optional or can be replaced by alternatives.

My application, Serial No. 229,852 filed June 4, 1951 discloses both joinery and prestressed constructions but does not claim the features of this invention. The said copending application claims several distinct inventions, from which said application the structurally engineered embodiments are illustrated by that embodiment defined as a preformed reinforced concrete structural member comprising a row of adjacent preformed concrete units, each having substantially a planar face, said faces being substantially coplanar and completely covered by a layer of polyester resin composition, said faces being penetrated by said resin composition, and the portions of said units adjacent thereto being permeated by said resin composition, a fiber glass mat covering said faces and embedded in said resin composition, and a prestressed elongated strand spanning the units and being embedded in said resin composition in a state of tension, said resin composition bonding said strand and fiber glass mat to said units. Such constructions are illustrative of the constructions joined by the joinery features of the present invention and I provide by such combinations various invented decorative-structural resilient functionally designed constructions.

Other features and constructions of my copending applications of record and in particular Serial No. 229,852 provide components for the composite constructions I make in using the joinery means of the present invention.

Serial No. 498,715 filed April 1, 1955, as a continuation-in-part discloses and claims the combination of the reinforced plastic with the building unit, e.g., a concrete block, concrete slab, concrete wall, ceiling, floor, roof, beam, column, or other building component; and the nature of such combinations, whether in single or multiple joined units wherein the surface is improved and the structural strengths and resistances of the units are greatly enhanced. The features of my copending application Serial No. 498,715 are cooperative with those of the present invention. Embodiments made by the disclosures of Serial No. 498,715 are joined by and with the means provided by the present invention.

An invention of Serial No. 340,642 filed January 16, 1953, provides materials in packaged form and provides means and apparatus for making features of the present invention. Some of the joinery materials I use are most advantageously provided by the means of Serial No. 340,642 for use in the present invention.

An invention of Serial No. 345,084 filed March 27, 1953, provides additional materials and methods for making features of the present invention, e.g., that of making stressed laminated joints whereby the plastic resin-fibrous stranded reinforcements of Serial No. 345,084 are pre-tensioned prior to incorporation in a joinery construction of the present invention and having combined features of mechanically induced and chemically induced force systems in the finished constructions of the present invention.

My copending application Serial No. 542,658 filed October 25, 1955, also cooperatively provides features of invention which are used advantageously by me in the present invention in fabricating precast structural elements embodying the features of Serial No. 542,648 and the present invention in cooperative use. The integrating of building and structural elements and components into the finished structures and buildings comprises several independent elements and components, designed, combined and cooperatively used in a structural engineering manner.

My copending application Serial No. 558,734 filed January 12, 1956, is concerned broadly with articulated building structures and especially with such structures wherein the blocks and the joints sandwiched between them mutually serve and protect each other. The joint protects the blocks from destruction by tensile stress under impact, shock and/or vibration and the blocks protect the joint material from exposure to fire, weathering, etc., and provide the primary structural strength to support normal static loading.

The articulated building construction embodying the features of Serial No. 558,734 and of the present invention cooperatively used provide prestressed buildings and structures having their members connected by shock absorbing connections of the present invention advantageously used in cooperative balanced designed constructions of prestressed structural reinforcement, both of conventional type of prestressing means and those of the present invention. The seven inventions, each distinct inventive concept, can be and are combined in selective combination to provide high strength decorative-structural composite constructions having the joints and the joinery of the present invention.

The joints and joinery employed in this invention are in and of themselves prestressing means which can provide the primary prestressing for the preloading of structures as well as themselves being prestressing load bearing members which are capable of substantial amounts of captured preload permanently remaining therein for the life of the structure. At the same time and in the same place in any given construction the inventions provide prestressing features all in conformance with structural engineering specific designs and also provide resilient resisting shock absorbing constructions of a high order of dampening qualities and impact-impulse loading capacities as shown hereinafter below.

By recognizing the resilient resisting features of the materials of this invention in use and the properties of resilient resistance inherent in prestressing features of this invention, the improvements claimed provide improved and much more efficient structural assemblies of materials and especially of precast concrete elements and constructions which are cheaper in cost of construction in both time and money and in ownership than present constructions. Further, prestressing in and of itself provides articulative, resilient resisting features in the present invention in the combinations of structural elements and methods for their use and in individual constructions.

Roads and highways, bridges and structures subject to tornado, hurricane, earthquakes, blast forces or in fact any dynamic or large vibratory loading are less costly to maintain in their usual static load bearing capacities and by the present invention have features provided by the prestressing means in combinaiton with the shock absorber means to very efficiently resist dynamic loading in substantial amounts. The combination of shock absorbing connector and connection means and prestressing features of the invention are provided by mechanical, hydraulic, pneumatic, fluid, plastic, fiberous, resinous, rubber-like, rubbery or other suitable shock absorbing connector and connection means which together with the features of prestressing provide the characteristics and improvements of the present invention.

Although the embodiments and examples set forth hereinbelow are in part substantially identical with those given in companion cases covering related but distinct inventions, it will be understood by those versed in patent law and practice that this is because these practical articles and methods embody several inventions, each or some of which can be used with or without the others, i.e., some of the inventions thus used together may be considered optional or can be replaced by alternatives.

These embodiments and examples together with various ancillary features and objects of the invention, which will later become apparent as the following description proceeds, are attained in the present invention, a preferred embodiment of which has been illustrated in the accompanying drawings, wherein:

Figure 2 is a central sectional view taken on an axial plane perpendicular to that of Figure 1 through a joint with the connector shown in elevation and the connection shown in section, and parts being shown in the normal position when under normal static load;

Figure 1:
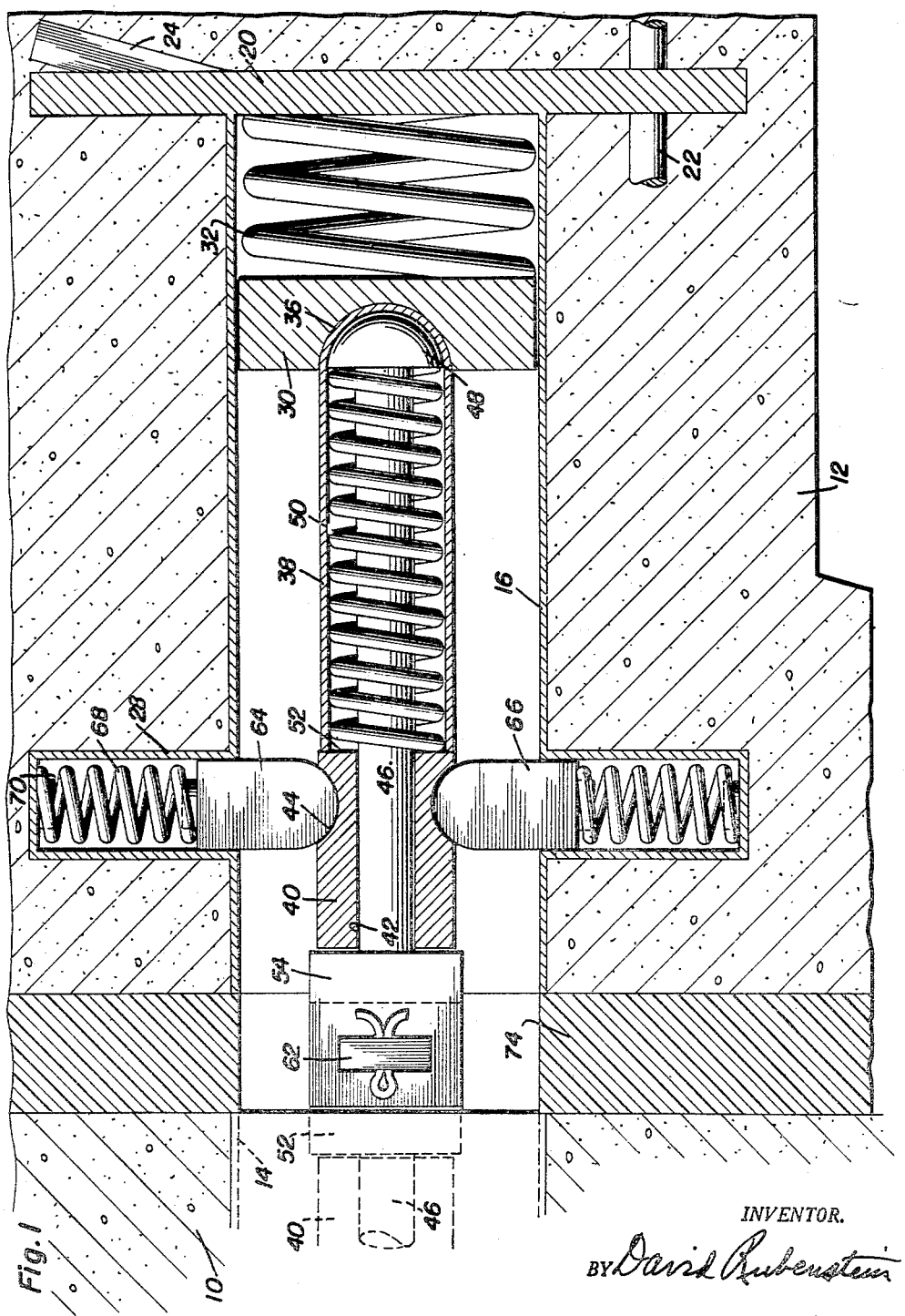
Figure 1 is an enlarged central sectional view through a portion of a joint construction showing one form of the novel shock absorbing connector and connection forming the subject of this invention operatively applied thereto.

Figure 3 is a view similar to Figure 2 but showing the positions assumed by the parts when relative movement or displacement has occurred instantaneously in the joint under the imposition of a shock load applied thereto; and, Figure 4 is an exploded perspective view, parts being broken away and obvious parts omitted, of the essential elements of the shock absorbing connector illustrated in the drawings.

Figure 5 is a view similar to Figure 3 but showing the positions assumed by the parts when relative movement or displacement has occurred instantaneously in the joint when the joint is under the imposition of a shock load applied thereto and shows the prestressed cable in additional load caused by the displacement, and, further shows the joinery connection layer in shear and tension loading.

Figure 6 is a longitudinal section through a shock absorbing connector and connection and a prestressing cable assembly connected thereto which shows means for the load transmission continuity of the structural reinforcement by the assembly.

Figure 7 is an enlarged partial sectional view of shock absorbing connector and a prestressing cable assembly showing the means of load transmission in the assembly wherein the casing member provides anchorage and continuity features.

Figure 8 is an isometric view of a portion of a building showing precast-prestressed concrete panels or the like reinforced transversely with prestressing cable means and shock absorbing connectors disposed in said prestressing means with the prestressing cables acting in prestress loading through the joinery and the pieces of the combination joined and reinforced by a reinforced plastic joint construction of this invention, the fibers of which are loaded in prestressed preload by hydraulic ram and pump jacking means (not shown completely), said preload induced into the fiber reinforcing prior to the final securement of the transverse reinforcement in its prestressed preloading, and said reinforced plastic joint material providing reinforcement and increased strength to the concrete of the concrete prestressed panels to designed depths adjacent to the joint in the panels.

Figure 9 is a cross sectional view of Figure 8 showing the shock absorber connector and the prestressing cable connected thereto in elevation and the high strength bonding and features of the reinforced plastic joinery wherein the joinery of the construction exists in both transverse and longitudinal prestressed loading.

Figure 10 is a longitudinal view of a system of joinery of this invention showing an assembly of hydraulic shock absorbing mechanisms and prestressing cables and anchorage therefor and showing capabilities of the system for load transfer between members through non-metallic joint and joinery of this invention, said joint and joinery capable of being prestressed as a preloaded construction in multi-directional prestressing.

Figure 11 is a longitudinal sectional view of a hydraulic type shock absorbing mechanism cooperatively employed with prestressing cables with said system in longitudinal preloaded prestressed condition through the joint and joinery and the construction further prestressed transversely by the materials of the joint and joinery.

Figure 12 is an isometric view of the hydraulic shock absorbing mechanism of Figure 10 showing the continuity of the prestressing cable through the shock absorbing mechanism.

Figure 13 shows a partial perspective interior view of a portion of a building construction embodying features of the invention;

Figure 14 shows an enlarged cross-sectional view of Figure 20.

In the present invention the combination of features, joinery and joints like layer 74 existing in a prestressed state in a prestressed construction provide means for continuity of frames and beams to be had with the ability to provide plastic hinges for the structure and structural members when its loading pattern stresses the structure or some of its members beyond the elastic limit of the members. Sufficient resilient resistant structural members of joinery can be built into a continuous member like a frame or a beam to assure linkage of a strength and type with which to provide plastic hinges for conditions of loading in excess of the elastic limit. Loads corresponding to each possible type of link mechanism can be computed by the method of virtual displacement in which the smallest one is considered as the one under which the structure will fail. An equilibrium check should show that nowhere in the member or structure are the bending moment forming plastic hinges exceeded.

In the present invention the dampening influences of the shock absorbing connectors and connections like layer 74 change the energy phase of dynamic loading of the building or structure so that much more rapid return from loading existing in the building or structure under plastic deformation beyond the elastic limit of at least some of the parts of the construction can be had. Complete load transfer conditions can be had within the elastic range, while momentary dynamic loading is rapidly dampened by the impedance features of the invention which tends to destroy dynamic energy inputs to the structure by conversion into heat or other energy forms, i.e., returns to the structure rapidly to a normal static loading condition.

In the accompanying drawings, Figures 1, 2, 3, and 4, a joint is disclosed between two relatively movable members having portions 10 and 12 disposed in juxtaposition to each other and bonded and connected to and compressively retained to each other to provide a joint therebetween. Obviously, these members 10 and 12 can be part of any desired elements that are structurally feasible, although, as illustrated they form portions of precast concrete supporting frames. Embedded within, extending between and placed between and into the portions 10 and 12 is a combined shock absorbing and connecting member consisting of a mechanical spring type shock absorber enclosed in a pair of casings 14 and 16 and a resiliently yieldable resistance layer 74 which layer acts as a connecting member and subject to various other structural and functional designed uses, i.e., suitable for different specific structural engineering needs. These members function to maintain the portions 10 and 12 together to form a joint; but permits a limited relative movement between the portions 10 and 12 under the impact of shocks applied to these members from any of various directions.

As shown in my copending application Serial No. 498,715 filed April 1, 1955, and in my copending application Serial No. 558,734 filed January 12, 1956, I have found that building structures and engineering structures in general, like bridges, wharfs, roads and the like, can with economy, be made to have extraordinary strength and permanance against both normal and abnormal conditions when built up of blocks adapted rigidly to withstand compressive loads, by which I mean to include blocks of various kinds, whether solid or hollow, whether of simple uniform shapes, massive, more or less cubical, as in a horizontal course of an ordinary cut stone wall, of flat slabs or strips, or of irregular shape as in a fieldstone wall, or of complex shapes, as in a gothic colum or a groined arch, and whether stone-like, as in the case of natural stone, artificial cast stone or bonded sand or aggregate concrete or cinder-concrete, or pumice concrete, Rocklite (an inert lightweight aggregate produced by calcining a special blue clay to incipient fusion after the material (raw) has been graded and crushed. Well rounded aggregate particles having a tough skin that surrounds the vesicular interior results in the process of making) concrete, manufactured or natural aggregate concrete, or of other compression resistant structural materials. The blocks may in some cases be even of cemented fibrous material, rock fibers, rock wool, metal, glass or plastic, although such blocks are not fully equivalent to the stonelike blocks for the purpose of the invention disclosed in my copending application Serial No. 498,715 filed April 1, 1955, or Serial No. 558,734 filed January 12, 1956, or in the present invention.

The blocks, according to my invention, are secured together by means adapted, when stressed, to yield to a limited extent, and with resistance but with restoring force which increases with amplitude of distortion. Because each joint in such a structure is adapted to yield only a little, the impact of an extraordinary force can be absorbed by very substantial yield in the total structure but distributed in the structure, a little in each joint.

Because each joint yields with resistance a little of the energy of such impact is absorbed and dissipated at each joint and there is not a sufficient concentration of energy at any point to seriously damage any part.

The joints between these blocks in my invention are made with resilient polymeric adhesive or laminating materials (i.e., materials having long chain molecules joined together, wherein forces within the molecules allow limited resilient distortion). Advantageously, according to my invention, the joints are reinforced especially by fillers, fibers, fabrics (including fibers in random orientation as well as woven fabrics), especially cushions of fiber glass, which is very highly elastic, or Dacron, a polyester fiber which is somethat more rubberlike in its elastic properties. Such cushions may support the compressive load in such joint to avoid gradual squeezing out of more plastic polymeric material; the polymeric material serving as bonding agent and resistance material providing tensile connection between blocks and serving to dissipate in the joint some energy of shock impacts. Advantageously the resin is an indurated (cross-bonded polymer) resin so that it will not readily flow out from the joints under static loads.

The laminating material is one which adheres to the blocks and advantageously also to the reinforcing material used in the joint. Advantageously this laminating material is supplied in a viscous liquid condition such that it flows into interstices of the block material and surrounds its granular or fibrous constituents so that it holds by mechanical anchoring as well as adhesive. Likewise it flows around and adheres to the individual fibers and other particles of the reinforcing material in the joint.

In this present application the joints and joinery as joinery between the concrete portions 10 and 12 as shown in Figures 1, 2, 3, 4, 5, 6, 7, 8, 9, 10, 11, and 12 or in fact any joint of this invention, can have an added feature to those already shown above in my copending application Serial No. 498,715 filed April 1, 1955, in that concrete portions 10 and 12 when precast may have in the aggregates of the concrete mixture materials used as part of the aggregate mix which will chemically bond by means of a chemical reaction to the plastic resins, fibers or materials of the laminating materials of layer 74. This provides three types of bond, i.e., mechanical anchoring bond, adhesive bond and chemical integration bonding of two or more materials into unitary compositions, and all attainable in the present invention by means of physiochemical reactions and all of which contribute to prestressing features of the present invention. When polymerizable plastics are penetrated and permeated into the pores and interstices of the concrete body of portions 10 and 12 they are available to surround the granular constituents of portions 10 and 12 as well as unite with all or portions of the granular constituents in chemical bond, i.e., when prearranged and predetermined placement and characteristics of the several materials are so designed to chemical engineering standards of structural design.

In the present invention additional features derived from mechanical prestressing means provide pressures when the joints and joinery are being built to place to designed depths and placement constituents of plastics, both polymerizable and not, so that the features derived from penetration and permeation and from physiochemical reactions such as shrinkage and chemical combination can be had. The concrete or the like which makes up portions 10 and 12 or similar sections of the inventions serves as a reservoir for plastic resins and the like and when the concrete and plastic resins or the like are in physical bond or in chemical bond, or both, the resulting structural material has new properties. By design I make concrete-plastic resin mixtures have tensile strength not present in the raw concrete, or compressive strength, or shear strength, or torsion strength at the choice or will of the designer. Selected characteristics in the porosity and pores of the concrete I use in portions 10 and 12 provide means of determining amounts of plastic resins that can be combined with the concrete and the nature of such combinations will vary as the concrete mix designs vary, but, however, are controllable by the use of materials engineering techniques and knowledge.

This present invention provides thin membrane type as well as thick membrane type laminated materials (either as single laminations or as multiple laminations of like or unlike materials) possessing great strength in tension laminated whether by physical bond or chemical bond or both, with thicker materials of relatively low tensile strength but great compressive strength. By sandwiching the high tensile strength, fiber-reinforced laminating polymer between thermal insulating type high compressive strength block (e.g., concrete block made with Rocklite, pumice, or other porous volcanic aggregate, fire expanded shales, lightweight porous ceramic aggregates, etc.), a reinforced structure can have its reinforcing elements protected by non-burning heat insulating exterior portions.

Expanded plastics, if used in the sandwich as herein described, provide extra capacity to absorb shock and impact loads and also provide thermal insulation. In the present application, expanded plastics can provide substantial amounts of prestress preload forces with which to not only achieve greater penetration and permeation into portions 10 and 12 but with which to maintain constant preload in the materials of the joint and joinery between the portions 10 and 12. It is possible by design of the sandwich or laminating materials to accentuate any of many characteristics such as resilience, soundproofing, moisture-proofing, shock-proofing, light weight, strength, etc. The use of strong resilient fibers, fiber glass reinforcements, with or without wire mesh or wire in other form, and plastic resins of high tensile strength will provide further building improvement.

The shock absorbing connector shown in Figures 1, 2, 3, and 4, as the first element of the combination comprises a pair of casing members which may conveniently consist of the cylindrical sleeves 14 and 16 which have integral flanged bases 18 and 20 together with open end portions opposite these bases, the sleeves 14 and 16 are suitably embedded in the material of the portions 10 and 12 with their open ends disposed substantially flush with the adjacent surfaces of the end portions, and with their enlarged bases 18 and 20 securely anchored in the material of the portions 10 and 12, said casing members separated by a resilient high strength bonding layer 74 which bonds, strengthens, and is desired, prestresses the combination, and itself is cable-like and reinforcing as a structural reinforcement.

The casings 14 and 16 thus constitute chambers or housings which open inwardly into the portions 10 and 12 from adjacent surfaces thereof, and are fixedly and rigidly secured in the material of these portions.

The principles of this invention do not depend upon any particular means for securing the casings 14 and 16 in the portions 10 and 12, although it may be found expedient to cast the material of the portions about the casings, or as an alternative, provide holes or recesses cast into the portions 10 and 12 in which the casings 14 and 16 are secured by high strength plastic resin mixtures which I call "resin-crete" and which possesses adhesive, bonding and integrating properties making such combinations into unitary structural elements. When desired, further anchorage for the casings may be provided by forming apertures through the flanges 18 and 20 and disposing anchoring rods 22, see Figure 1, through these apertures for embedment in the material of portions 10 and 12, while these apertures and rods may be supplemented by or have substituted thereform deformable portions 24 integrally struck from the flanges as shown in Figure 1.

At any convenient and suitable location along the length of the cylindrical casings 14 and 16, as for example closely adjacent the open ends of the same, is disposed an annular or cylindrical enlargement 26 and 28 respectively. These enlargements constitute annular chambers which communicate with the interiors of the casings 14 and 16. Obviously, the casings, their base flanges and the enlargements can be fabricated and assembled in any suitable manner, the principles of this invention not being limited to any particular mode of construction.

In the normal assembly of the portions 10 and 12 of the joint, the casings 14 and 16 are disposed in alignment with each other in the manner shown in Figures 1 and 2, but may be displaced from each other as disclosed in Figure 3 when one of the members or portions 10 is moved with respect to the other portion 12 under the influence of shock or other energy applied to the members of the joint.

The shock absorbing connector includes an assembly which is movably received within the casings 14 and 16. This assembly includes a pair of plungers or pistons of identical construction as indicated at 30, one such plunger being slidably received in each of the casings 14 and 16 adjacent the closed end of the same, each plunger engaging a compression spring 32 which is positioned between the plunger and the adjacent closed end of the casing. Upon its side opposite the compressing spring, the plunger 30 is provided with a hemispherical or similar socket or recess 34 which is adapted to swivelly (or articulatively) receive the spherical end 36 of a sleeve 38. The closed extremity of the sleeve 38 is thus swivelly and articulatively positioned in the socket 34 of the plunger 30 for free movement therein for a purpose which will be later apparent.

The open end of the sleeve is intended to be attached and secured in any desired manner as by screw threads, welding, a press fit or the like to the end of or upon a relatively thicker bushing 40. As shown in Figure 1, the external diameter of the bushing and sleeve may be the same so as to present in their assembled position and relation an elongated cylindrical member of uniform external diameter. The bushing 40 is provided with an axial bore 42 extending entirely through the same and communicating with the interior of the sleeve. The exterior surface of the bushing 40 is provided with a circumferential groove 44.

A bolt assembly is movably received in each of the two casings 14 and 16 and consists of a pair of identical bolt members 46 which are slidingly received through the bores 42 of the bushings 40 and extend into the interior of the sleeves 38, having fixedly secured or internally formed upon their outer extremities hemispherical heads 48 which are swivelly and articulatively received in the hemispherical closed extremity 36 of the sleeves 38.

Compression springs 50 encircle the bolts 46 and have their extremities abutted against the heads 48 and shoulder or abutment surfaces 52 provided by the ends of the bushings 40.

At the opposite ends from their headed portions 48, the bolts 46, as shown in Figure 4, are provided with complementary connecting members, one of which may consist of a U-shaped head or yoke 54 which receives an extending medially disposed rib or flange 56 carried by the other bolt, i.e., like in a universal joint. Cooperating apertures 58 in the yoke members 54 and 60 in the rib 56 are adapted to register with each other and be secured together as by a headed fastening pin or an equivalent fastener 62. Thus, the two bolts are articulatively attached to each other at their midpoints by the pin or any other equivalent fastener 62.

In the assembled position, it is preferred that the articulative connection between the members 54 and 56 shall lie in the space between the adjacent surfaces of the portions 10 and 12 as shown in the drawings.

A split ring assembly which may conveniently consist of a pair of hemispherical segments 64 and 66 are provided having arcuate internal bearing surfaces adapted to set and engage in the circumferential groove 44 of the bushing 40, these segments in their assembled position being of sufficient size to extend upwardly into the annular or cylindrical casings 26 and 28 as will be clearly apparent from Figure 1.

The segments 64 and 66 serve to apply a spring load to the bushings 40 and through the latter to the bolts 46 of the shock absorber assembly.

The necessary spring pressure can be applied to the pressure segments 64 and 66 by any suitable resilient or pressure means disposed within the cylindrical casings 26 and 28.

Chiefly for convenience of illustration, the pressure means disclosed comprises a plurality of coil or compression springs 68 which are adapted to abut the inner circumference of the annular casings 26 and 28 and the outer circumference of the ring segments 64 and 66. In order to properly position the springs, spring seats or abutments 70 may be provided upon the internal surface of the annular casings 26 and 28, while similar seats or abutments 72 can be provided upon the ring segments.

For convenience of illustration, Figure 4 discloses the ring segments as having four such spring seats or abutments 72. However, it will be understood that any desired number of such springs and spring seats can be provided, it being within the comprehension of this invention to solidly fill the space between the inner circumference of the casings 26 and 28 and the outer circumference of the ring segments with a plurality of these springs.

However, it should be clearly noted that the principles of this invention are not limited to this manner of applying a spring load to the pressure rings 64 and 66 but that any other source of pressure such as various other mechanical spring assemblies or hydraulic assemblies, hydraulic pressure means, fluid pressure means, and even pressure from deformable materials such as rubber, plastics, expandable elastomeric plastics, shrinkage forces inducing pressure and the like can be utilized to resist inward movement of the ring segments from their central position with respect to the cylindrical casings 26 and 28.

It is also within the comprehension of this invention to provide means for adjusting the initial spring pressure normally maintained upon the pressure ring sections 64 and 66 when the shock absorber connector connection is in its normal static load position.

In the construction illustrated, this adjusting means could readily comprise the mounting of the spring seats 70 upon screw threaded plugs in the outer cylindrical wall of the casings 26 and 28 for screw threaded adjustment inwardly thereof to thereby vary the normal loading of the compression spring 68.

The provision of adjustability for varying the loading of the spring means is a very important feature of this invention in that it enables a standard construction of shock absorber connector to be fabricated and thereafter to have its spring pressures adjusted in accordance with the particular normal static loads to be imposed upon the joint and connector.

Thus, regardless of the type of pressure applying means for the connector, it is within the comprehension and intent of this invention to provide a means for adjusting the same or presetting this normal loading of the spring means before the device is installed in a joint construction. This is a most important feature, especially when prestressing cables of any type are connected to the connector whose internal stress characteristics must needs be modified after installation due to plastic flow of the cable materials or other physical change in the load bearing characteristics of the construction, as will be brought out as an important feature of this invention.

It will now be seen that when the device is installed as illustrated, the two casings 14 and 16 will be fixedly bonded to the joint members 10 and 12 for movement therewith and resiliently separated but structurally connected by the bonding layer 74. The moveable inner assembly of the shock absorbing connector will be centered by the opposing spring pressures of the springs 32, which will individually resist movement of the inner assembly in either direction. Thus, when a shock or force is applied to one of the members such as 12 tending to urge it toward the member 10, the spring 32 strongly resists such movement and converts all or part of this thrust into work or heat, the energy of which is dissipated rather than transmitted through the joint, and as will be shown, is materially assisted in so doing by the dissipation of energy consumed in providing a change of state for the elements of the construction as well as by the damping and impedance influences upon force transmission as shock by the resilient bonding layer 74.

Similarly, the imposition of a force upon the members which tends to separate the same will be resisted by the forces of the springs 50 which will thus dissipate the energy of such thrust or shock. Still further, any tendency of one member to move, swivel articulate or rotate with respect to the other member will be resisted by the resistance of the deformable packing, sealing laminated and/or reinforced material 74 which in itself can be a structural load bearing construction interposed between the adjacent surfaces of the members 10 and 12 and as disclosed and claimed in my copending application Serial No. 542,658 and my copending application 558,734 filed October 25, 1955, and January 12, 1956, respectively, and as originally shown in my application Serial No. 210,803 filed February 14, 1951, and now abandoned.

A sliding displacement of members 10 and 12 with respect to each other from the position shown in Figure 2 to that shown in Figure 3 for example, will be resisted by the resistance of the spring 68 through the pressure rings 64 and 66 to lateral displacement of the latter from their centerd position in the casings 26 and 28.

It will thus be apparent that mechanical or fluid pressure or hydraulic means or deformable means are provided which will resist longitudinal displacement of the portions 10 and 12 in either direction, a lateral shifting of these members, or a torsional twisting or displacement of the same. Thus, energy shocks impacting upon either of the members 10 and 12 from any direction, such as necessarily result from bomb blasts, earthquakes and the like, will be absorbed, converted to work in the shock absorber mechanisms of the joint construction and dissipated harmlessly without damage to either the joint, the members of the same or the entire construction of which the joint may be a part.

In addition to the resilient, laminated, yieldable and/or deformable packing, filler reinforcing layer 74, a similar yieldable resistance 174 as shown in Fig. 7, may be incorporated in the interior of the casings 14 and 16 for the purpose of further damping movement of the inner member with respect to these casings.

It should be here noted that whenever the members 10 and 12 shift laterally with respect to each other, as illustrated by comparison of Figures 2 and 3, the inner assembly will be displaced from its central position shown in full lines in Figure 1 and in Figure 2, to a position such as that shown in Figure 3. This tilting of the inner assembly from its axial position is, of course, resisted by the spring assemblies 68 and the pressure rings 64 and 66 and also by the resilient bonding material which may be used in the casing as well as the bonding layer 74. Any axial or longitudinal displacement of the inner assembly with respect to the outer assembly will of course be resisted by the spring assemblies 32 or 50, and also by the resilient bonding material and the bonding layer 74.

From the foregoing, it will now be apparent that this connector may be constructed with any desired strengths of springs or spring means, hydraulic resistance means, pneumatic resistance means, reinforced plastic means or in fact, any means as is within the scope of the intent and purposes of this invention and including the various means shown in my copending applications of record, so as to remain in its normally centered position under normal static loads. However, upon a predetermined overload by the imposition of a shock wave or the impact of energy from any direction whatsoever, the energy imparted to the device will be absorbed and converted and dissipated harmlessly as hereinbefore set forth.

Although the shock absorber connector has been shown as embedded in the material of the two members 10 and 12, it will be apparent that the principles of the invention may likewise be employed in other manners in which the shock absorber is associated with the members. In some instances, it may be desired to secure the shock absorber connected to the exterior surface of one or both of the members; to dispose the same in open recesses in the sides of the members 10 and 12, or operatively connect and rigidly anchor their extremities to such members in any desired manner. The principles of the invention are considered broad enough to cover any manner of attaching the connector and the connecting layer 74 to the members 10 and 12 provided the above described functioning is affected.

In the Figures 5, 6, and 7 the construction and features shown in Figures 1, 2, 3, and 4 show the construction of the shock absorber and the shock absorbing connection as layer 74, with Figure 5 showing the construction in the positions assumed by the parts when relative movement or displacement has occurred as from a shock or earthquake loading instantaneously in the joint when the joint is in dynamic loading in addition to its normal static load and shows the prestressed cable connected to the shock absorber with the prestressed cable 106 loaded in addition to its normal static load by the dynamic load caused by the displacement, and further, shows the joinery connection layer 24 which bonds members or portions 10 and 12 into a unitary structural assembly in a stressed condition of tensile and shear loading and which could also be in torsional loading depending upon the directive force characteristics of the dynamic loading as applied to the construction.

When it is desired to maintain complete continuity in the prestressing means as is shown in Figure 6, the prestressing cable or tendon is designed to resist both the dynamic and static loadings and keep the construction in a state of load bearing equilibrium. Such a prestressing tendon 112 can have, and the whole shock absorbing system have, known and designed values of elasticity such as can be obtained from fiber glass reinforcement stranded cables in an amount of about 3% stretch as an elastic construction. Dacron fibers when used for a prestressing cable 112 can have much more elasticity, and be very rubber-like in its response to loading in the dynamic phase. Dacron fibers can be had with about 20% to 24% stretch and in unidirectional fibers provide prestressing materials of substantial strength, which e.g., can be supplied to maintain normal static loadings as well as act as shock absorbing cables and construction when loading in the dynamic phase is encountered.

In Figure 6 the features of the connector are essentially the same as is shown in the Figures 1, 2, 3, and 4 shock absorbing connector with the exception that the plunger 30 here shown as member 90 is a member in direct connection with prestressing cable 112. The plunger 30 here shown as member 90 is accessible from both sides with a spherical member 97 fitted therein which forms a universal joint permitting a certain amount of rotation and articulation when the cable 112 or bolt 46 are stressed dynamically in a direction not in unidirection of the assembly. The other features of the combination act to relieve dynamic loading as above described in Figures 1, 2, 3, and 4. The spherical member 97 can be a component part of the cable 112 or it can be attached by known means such as screw threading or welding or press fitting, or as shown in my copending application Serial No. 345,084 it can be an integral enlargement in and of the cable 112.

In the Figure 7 the features of the shock absorbing connector are essentially the same as in Figures 1, 2, 3, 4, except that the casing of the shock absorbing connector acts also as the end connection for prestressing cable 112z or 106z. In this construction dynamic loading is taken by the shock absorber, the prestressing tendon or cable as well as the bonding layer 74. A means for adjustment of the tension on the prestressing tendon is afforded by restraining nut 104z which can be adjusted to increase or decrease the tensile load in the tendon 106z which has a portion 105z which is threaded 107z which permits the adjustment. The prestressing tendon or cable shown is similar to cable as made by the John A. Roebling's Sons Company of Trenton, N.J., or can be one of my invention made of non-metallic materials as shown in my copending applications. Such a prestressing tendon is usually placed in a tube of any suitable material, such as paper, polyethylene plastic, steel conduit or rubber-like plastic for the purpose of protecting the same from contact and abrasion with the concrete body being reinforced and prestressed and is shown by member 103 in Figures 6 and 7. Conventional end anchorage as is used in prestressing structures is shown by members 108, 109, 110 and 111, said members operative through restraining washer 113 plate.

Referring now to the bonding layer 74, it possesses several new and novel features in which it provides bonding between portions or members 10 and 12, it provides reinforcement of the concrete in and of members 10 and 12 by the permeation and penetration of materials of the bonding layer 74 into the body of members 10 and 12, and as a special feature of the present invention provides two types of prestressing constructions, i.e., thermal, mechanical and physio-chemical prestressing, in and of the layer 74. It also provides resilient resisting shock absorbing properties highly efficient in resisting dynamic loading and acts as a supporting, restraining, elastic, strengthening, spring like member to return the construction to normal position after impact-impulse loads occur as well as resist these loads while occurring. Layer 74 also provides fluid tight, gas tight, unitary connections so multiples of members 10 and 12 are made into unitary structures having unitary surfaces, easily cleanable and permanent in their poinery and joints. As a prestressing tendon it is capable of substantial preload permanently fixed into the construction. It can be prestressed by mechanical means, thermal means and physio-chemical means.

The bonding layer 74 is made of fiber reinforced thermoplastic or thermosetting resin or resins or of elastomers and elastomeric rubber-like materials plastics in which fiber glass reinforced or Dacron reinforced or other fiber alone or in combination with either of them are bonded and connected to concrete bodies. Fiber glass is used in its several forms of mat, roving, fabrics, cords, cables, belts and tapes and used alone or in combination with other non-metallic fibers with plastics which together form substantial, strong members of joinery and joint and provide strengths in compression, tension, shear and torsion equal to or greater than the materials such as concrete or the like which are being joined in any or all of the above strengths.

The bonding layer 74 can be made in several desired manners of construction that provides resiliently resisting strengths, resistantly resisting strengths and yieldingly resisting strengths, e.g., but in no way limited to, strengths of say 50,000 p.s.i. in tension, 30,000 p.s.i. in compression, 20,000 p.s.i. in shear and 20,000 p.s.i. in torsion. The limiting useful strengths of the structure are the resultants of cooperative strengths exerted by the concrete body, its reinforcement materials and the materials of this invention which make up its joinery.

The mechanical means herein described in Figures 1, 2, 3, 4, 5, 6, 7, 8, and 9 is only illustrative of concept of one feature of my shock absorbing connector constructions. Member 74 as a bonding layer with structural functions is the second part or feature and provides shock absorbing means as well as high strength joinery means. Prestressing forces provided by the prestressing means disclosed in my application Serial No. 210,803 filed February 14, 1951, and now abandoned, provides a third part of my concept or feature in the present invention and in prior applications of record. Prestressing materials such as for example, steel tendons, wires, cables and rods used as shown or in conventional means provides the fourth part of my concept and features. Hydraulic resistances and pneumatic resistances alone or together as components of the bonding layer 74 or as provided by mechanisms operated by hydraulic or pneumatic means as herein explained provide component features of my concept when designed into specific load bearing constructions.

It is possible to knock out portions of the concrete body components such as portions of 10 and 12 and still retain the identity of shape and integrity of entity of a structure or building construction because the joinery materials not only serve to join but can be considered as framing materials, self-supporting in at least one direction and load bearing and in a prestressed state.

The further means of joinery of structural components by providing prestressing cables, tendons, belt-like laminations as tendons which provide tensile reinforcements also provide compression forces by which joinery benefits and which makes the joinery that much more efficient, because members stay in tension which are subject to the full effects of stress reversal as occurs in say, certain blast loadings, earthquake, tornado and the like, do not live under full compression or full tension but rather live within more or less tension or more or less compression within the range of the designed prestressing loads.

By placing the structure, its components and parts, its joints and its joinery under compression, the joining means are much more effective in its several strengths, because the joinery features are under prestressed loadings in and of the joinery material of controlled amounts. These prestressed preloads are induced into bonding layer 74 by several means, e.g., the preload derived from shrinkage forces occurring in the plastic resins of the bonding layer 74 as the plastic resins polymerize into irreversible solids, or e.g., the preload derived by pretensioning the fibrous constituents of the layer 74 by hydraulic mechanical stressing means like hydraulic powered rams, said preload captured into the construction by the polymerization of the plastic resins which surround the fibrous constituents, e.g., fiber glass, nylon, Dacron, sisal, etc., as shown in Figures 8 and 9 of the present application. The structural elements of my Patent No. 2,671,158 provide constructions suitable for making the layer 74.

Member 74 or the like provides means to design rigidity and get rigidity into a joinery means when strong fibers such as fiber glass, hemp, manila, cotton, linen, inorganic fibers, organic fibers, synthetic fibers and plastics fibers used alone or in combination are bonded and fixed to the concrete bodies in which the strong fibers are prestressed.

Rubber, rubber foam, asphalt, and certain plastics in and of themselves provide values of a low order of strength when so designed in compression when in an unrestrained placement and in a non-prestressed state. When enclosed in envelopes of high strength, the designed placement and the designed load bearing characteristics provide substantially different values and can be so specifically used that in certain direction of load in the same materials possess a high order of strength. When reinforced with strong fibers the same materials provide still greater strengths in designed directions of loading.

Many bonding resins for use in constructions like bonding layer 74 are available for making the articulative joints and for a prestressing material in and of the body of the concrete bodies like members 10 and 12, and also, for prestressing materials used with fibers such as fiber glass and which together make reinforced plastic resin laminated constructions suitable as primary pretensioning prestressing tendons. Their selection will in part be determined by the same considerations which have led to the selection of plastics for each use to which they are put, i.e., structural strength, toughness, resistance to flow under stress, resistance to chemical attack and insect attack, resistance to oxidation, resistance to light and extravisible radiation, etc. Suitable resins for this include synthetic thermoplastic adhesve resins and compositions thereof such as vinyl resins, particularly vinyl chloride, vinyl chloride-vinyl acetate copolymers, vinylidene chloride and its copolymers, vinyl acetal, nylons, among others, and thermosetting resins and compositions thereof such as epoxy resins, phenol aldehyde resins, furan resins, amine aldehyde resins, polyester resins, silicone resins, natural and synthetic rubbers including butyl rubber, butadiene-styrene, butadiene-acrylonitrile, Thiokol (polysulfide rubber), chlorinated rubber, neoprene, Hypalon (chlorosulfonated polyethylene), polyamide-epoxy, etc. During application the resin composition is advantageously a flowable, more or less syrupy liquid so that it can penetrate into the porous structure of the block, or in fact any porous suitable compression resistance type material. The resin composition also can be a powder, paste or composition or with thixotropic properties, which, on the application of heat when in place on-site of final use as is provided in my Patent No. 2,671,158, will become flowable and during the change of state from powder, paste or composition with any specific properties found suitable, will penetrate and permeate the porous structure of the block or the like, etc. This consistency is then changed, by chemical reaction or by evaporation of solvent, or cooling, or setting, congealing, with or without shrinkage or expansion, to a tough, strong solid. Advantageously, specific properties of bond are utilized in a structural engineering manner and final bond is more or less elastomeric so that it can yield resiliently to a substantial extent; or if in combination of two or more plastic resins provide different values of elasticity and plasticity in the multiple layer 74 constituents; but, if the static load is supported by means which does not flow under static load (e.g., a rigid fulcrum member in the joint as described in my copending application Serial No. 558,734) there is advantage in use of a plastic which is subject to cold flow in the joint. Compositions of the above resins or plastics which have a relatively high degree of plasticity when enclosed in high strength envelopes as constituents of a joinery construction provide very important features of the present invention. The resin composition should not flow under normal load or expected shock load to such an extent as to be squeezed out of the joint, but a slight flow is advantageous to give a slight yield and damping effect on any harmonic motion to which the structure may be subjected. Resin compositions enclosed in high strength envelopes, particularly fiber glass and Dacron reinforced envelopes, can have flow as designed to structural dynamic load bearing considerations so that the plastic resins act as would very stiff fluids, especially where the property of plastic memory is utilized in the construction. Such constructions provide higher values in dissipation of energy because of the greater variation in cyclic transmission of force waves and the greater impedance and damping afforded.

A strongly cross-bonded or vulcanized resin is ordinarily more desirable for the joints and joinery. Epoxy resins have advantage in being able and capable of curing at room temperature to give hard or elastomeric strong solids and being excellent adhesive. The compounding of these resins to give particular properties desired for each application is according to known principles and pratice in the art of adhesives and plastics; but the application of the compositions to building according to my invention departs from usual practice in that, whereas it is well recognized in bonding parts that the adhesive should be as thin as possible between the bonded parts, I make a layer like layer 74 thicker and specifically designed as a structural load bearing member in and of itself, by the use of reinforced plastic compositions so that the adhesive layer actually serves as a cushion and articulation for absorbing shock and impact at the same time it serves as a reinforcement of substantial means as above described. Bonding layer 74 or the like, can and does provide reinforcement in my constructions which completely removes the need for steel, whether plain reinforcing, or prestressing type steel, in certain specific constructons at the will of the designed entity. In comparing the construction to steel framing, bonding layer 74 acts as does the web of an I-beam as a substantial component for structural support, and particularly in the present application, as a reinforced fiber plastic resin laminated construction suitable for post-tensioning and/or pretensioning as a prestressed preloaded construction. Such a joint and joinery construction can be of substantial thickness in designed relation to its requirements and duty in a composite concrete bodied or the like laminated prestressed reinforced plastic resin fiber glass or Dacron or the like non-metallic construction.

Referring to Figures 8 and 9 shock absorbers 38f are cast into precast prestressed concrete panel members of substantial size and strength and anchored thereto by bond and by members 75f and 76f. The two shock absorbers 38f are firmly connected by a universal type of joint as shown in Figures 1, 2, 3, 4, and prestressing cables 106f are connected to connecting members 107f as shown elsewhere herein in Figures 5 and 7 or as an alternate as in Figure 6. The cables 106f are enclosed in a protective tubing sleeve or housing 103f and the cables may be conventional steel cables as made by John A. Roebling's Sons Company of Trenton, N.J., or cables 106f may be made out of reinforced fiber glass plastic resin constructions as shown in my copending applications Serial No. 340,642 filed January 16, 1953, Serial No. 345,084 filed March 27, 1953, Serial No. 498,715 filed April 1, 1955, Serial No. 542,658 filed October 25, 1955, Serial No. 558,734 filed January 12, 1956, and my Patent No. 2,671,158, and my prior applications above referred to including Serial No. 229,852 filed June 4, 1951. The prestressing forces are applied to the steel cables, rods or wires in the conventional manner. The prestressing forces are applied to the fiber glass unidirectional strands of the cables of my invention in the manner shown in Figure 8 and as elsewhere shown in my copending application Serial No. 345,084. Further, the prestressing forces may be applied to the fiber glass unidirectional strands in the present invention by the polymerization reaction of the resins surrounding the fiber glass unidirectional strands wherein the shrinkage of the resins prestresses the fiber glass when the end anchorages not shown are first secured with the fiber glass unidirectional fibers in a taut but not prestressed condition prior to the starting of the polymerization reaction. With polyester resin compositions shrinkage of 6% to 7% is readily attainable, and more or less by specific designed formulations of my invention. With the fiber glass secure in a protective covering of plastic resin and the combination covered by a tubing which exercises restraint upon the combination except in longitudinal direction, the present invention provides substantial prestressed preload into cables 106f or the like. In the dynamic phase of a shock load the shock absorbing connector acts to prevent excessive overloads from stressing the prestressed cables 106f which are kept in a state of preload for static loading and for a predetermined dynamic loading. Loss of prestress by plastic flow of the materials of the cables 106f can be recovered by the direct means of adjustment features provided by springs 32 and nuts 110 shown in Figures 6 and 7.

Bonding layer 74 is shown with an eye like portion 122f which is made as disclosed in my copending applications Serial No. 345,084 and Serial No. 542,658, and is advantageously a polymerized section of the laminated construction of bonding layer 74 and is conveniently made prior to the insertion of layer into a joint construction. The shank of the polymerized section 123f is substantially built and offers a secure means of anchorage for the prestressing means partially shown by stress rod 124f which is slipped into retainers 126 which are connected to pull rods 125f. The envelope 121f which is made of a plastic resin which melts at a temperature lower than the polymerization temperature of the plastic resins 21f contained in the envelope and which surround and prestress the fiber glass 77f and can advantageously be polyethene or the like while the reinforcing plastic resins 21f can be polyester resins with or without fireproofing ingredients.

In the bonding layer 74 enclosed by reinforcing plastic resin 21f the fiber glass structural load bearing tensile reinforcement is disposed in a unidirectional continuous construction 77f advantageously so made to provide even stressing abilities of the construction when under initial prestressed preload as well as when in use for the life of the structure. The manner of making such constructions is disclosed in my above copending applications and particularly in copending application Serial No. 345,084. If desired for additional relief of dynamic loading, inside of the unidirectional strands of fiber glass there can be disposed a substantial layer of a rubber-like or elastomeric plastic which may or may not contain fiber glass strands for reinforcement. The rubber-like layer 78f can also be made of an expandable plastic material of a rubbery, elastomeric layer which expandable material can be actuated at the time of polymerization of the polyester resin 21f or in special constructions at another time. Such an expandable plastic can be used to force plastic resins 21f and those of the envelope 121f into the body of the concrete adjacent the joint making thereby very high strength joinery connections as shown by the fine lines at 79f representing the permeation and penetration of the plastic resins into the body of the concrete and which at 79f created zones of strength as shown at 79f and claimed in my copending application Serial No. 542,658, and additionally explained in the present application.

In Figure 9 the universal joint type of connection 100f is shown connected by bolt 120f. This feature provides another type of construction when it is desired to provide a building which can be demounted at will by removing the bolt 120f, as in certain types of military constructions. Such a construction can be assembled even in the dark when layer 74 is used as primary reinforcement and prestressed in place but not bonded to the sections 10f and 12f. Cables 106f when threaded through concrete or the like members 10f and 12f and prestressed by hydraulic rams (not shown) can provide the pressure with which to break open catalyst means pre-packaged and disposed in the fiber glass 77f and polyester resin 21f preimpregnated unidirectional and/or multidirectional mat layers of the unbonded portion of the laminated layer 74 construction and which becomes bonded after the polymerization reaction is started by the aforesaid pressure obtained in prestressing cables 106f.

When precast concrete members 10df and 12df are precast, shock absorber 38f and a paper or plastic tubing or metal conduit can be precast into the concrete so that a prepared hollow space 119f is already in place for the prestressing cable 106f and the shock absorber 38f securely anchored into the body of the concrete as end anchorage for the prestressing cable 106f.

The threaded end of cable fitting 107f shown by 111f can be adjusted from the outside of the construction by retaining nut 110f which is held against bearing plate 109f, same adjustment useful in applied use of prestressing forces and in securing the right amount of prestressing into a construction as required by the structural engineering design of the construction. In the Figures 8 and 9 the bonding layer or prestressing layer 74 is shown below the center of the construction of the joint and the placement of the layer 74 can be so disposed that the reinforcing fiber glass strands, or in fact Dacron strands, or any suitable strands can be placed in a catenary or parabolic arrangement for structural engineering design purposes. The precast concrete members can have a cross-section in which projections as shoulders 10ds and 12ds protect the lamination bonding layer 74 against the elements or fire.

In bonding layer 74 a construction as described and claimed in my Patent No. 2,671,158 but with end anchorages integral therewith as shown in the present application in Figure 8 and as described and claimed in my copending application Serial No. 345,084 filed March 27, 1953, is constructed substantially with the fiber glass stranded cables disposed in the lower portion of the joint and adapted to take flexural loading. Also above the universal-like connection 90h, a fiber glass cable (or more, if structurally needed) is provided to take reversal of stress loading as occurs in certain blast loads involving suction forces. The fiber glass strands 2h are pre-packaged in a thin polyethylene film 3h and heat sealed 30h in place in groups of strands of designed unidirectional strength as shown at 2h. Adjacent the stranded assembly in the valleys provided by the heat sealing of the polyethene film 3h at 30h spaghetti-like plastic envelope 4 containing catalyst suitable for polymerizing the plastic resin 21h are disposed with resistance wire 19h nearby in an adjacent valley or otherwise suitably disposed. The whole assembly is covered and protected with and by a layer of plastic resin 21h and enclosed in plastic envelope 3h. The packaged reinforcement comes to the installation site ready-for-use and even can be attached to the one side of a member like portion 10h at a manufacturing plant which makes prestressed panels like 10h could be. Such attachment is attained be adhesive bonding plastics and plastic resins of which the epoxy resins or epoxy-Thiokol or epoxy-polyamide resins could be used. Polyester resins containing substantial amounts of styrene are also advantageously used for resins 21h and upon the heating supplied by the resistance wires 19h as described in my Patent No. 2,671,158 are forced into the body of the concrete of 10h and 12 by the propelling forces attained by the vaporizing of styrene in the resin 21h as shown in my copending application Serial No. 498,715 filed April 1, 1955, and especially when the bonding layer 74 is confined between two concrete bodies under prestressed preload as provided by the prestressing system of cables 106h. The prestressed preload in the instant construction and others of my invention acts as would a press in supplying the pressure needed to accompany certain chemical reactions.

The shock absorber can have any of several packing gland devices and members 73h, 76h, and 85h are illustrative of means for retaining the hydraulic fluid in the chamber 75h. The hydraulic fluid can be of any designed viscosity to provide the resistance structurally engineered into the system in balanced design or the hydraulically operating material can be a plastic or plastic resin which on the indication and incidence of pressure of substantial magnitude moves molecularly within its body to accommodate stress, utilizing plastic memory to return to its unstressed condition on the removal of stress.

Figures 10 and 14 illustrate another type of hydraulically operated shock absorbing mechanism wherein the fluid containing hydraulic resistance features is contained in chamber 150 and under movement from stress is pumped or moved into chambers 159 and 160 depending upon the direction of flow in relation to the stress input. By placing chambers 159 and 160 in a position whereby the fluid can flow by gravity back into the chamber 150 from either position of stress, equalizing features in stress concentration dissipation are provided. The system of chambers are advantageously cast into a relieving, resilient shock absorbing encasement 162 of rubber-like plastic or rubber-like concrete-plastic mixture which aids the bonding layer 74 in absorbing dynamically induced stress imposed transversely to the direction of the prestressing cables 163 shown as steel or as an alternate type shown as 164 which are of fiber-glass Dacron construction. Plunger rod 151 is advantageously fitted with male and female parts as in a universal joint at 170 and 171.

In Figure 11 a more detailed view of the shock absorber is shown with plunger 155 consisting of a construction common to hydraulic rams and secured to plunger rod 151 and also in direct connection with the prestressing cable 164 by connection fitting 174. Packing nuts of hydraulic design 158 and 171 retain the hydraulic fluid in the chambers 157 and 156. Under stress inducing movement the fluid flows from port 153 into reservoir chamber 159 if the stress is applied inwardly of the right hand member 150 and the fluid flows from port 154 when the stress is in the opposite direction and into reservoir chamber 160. At the relief of stress or of a change in direction of stress the fluid flows by gravity into chambers 156 and 157 as these chambers can accommodate the fluid space-wise. The chambers 159 and 160 can be interacting without internal valves or resistances between them and chamber 150 or if structurally designed the orifices from chamber 159 and 160 can provide increasing impedance to flow as in the orifice of Figure 11. The hydraulic device as shown can be as made commercially and adapted to the use herein or it can be made with anchorage flanges and portions as in the device of Figure 1, portion members 20, 22 and 24 thereof.

Bonding layer 74 can be any one of the joinery layers as disclosed in my copending applications above referred to or as described in Figure 11. It can have included in the factory pre-packaged construction a heat resisting and elements resisting material like asbestos, fiber glass, pumice, Fibrafrax, a high temperature fiberous material as made by the Carborundum Company, Rocklite expanded aggregates and, in fact any suitable heat resisting material 169 which can protect the plastic resins and materials of the bonding layer 74 against fire. Such construction can be made to have four hour fire resistance and conform to the various Code requirements for fire protection, and even limited designed protection against flash from bomb blasts. In this construction the bonding layer 74 can be made integral with shock absorbing encasement 162 and structurally articulative under impact-impulse loadings from any direction.

Figure 12 is an isometric drawing of the shock absorber and shows the chamber 159 and 160 as a component part thereof but located design-wise above the center of chamber 150 so that the hydraulic fluid can flow from ports 153 and 154 by gravity into chamber 150. The two reservoir chambers 159 and 160 can be separate from chamber 150, even at a distance, as the action of the ram in chamber 150 acts as a hydraulic pump. The two chambers 159 and 160 can be attached to chamber 150 but upright as in other hydraulic systems. The two chambers can be hydraulic accumulators adapted to the structurally engineered balanced designed requirements of the present invention.

Figure 13 shows a partial perspective interior view of a portion of a building construction embodying features of the invention. Precast-prestressed member 314 is the frame precast member of my Design Patent No. 166,129 and is disclosed in Figure 15 of my Serial No. 340,642 filed January 16, 1953. It was also disclosed in my prior applications Serial No. 210,803 filed February 14, 1951, and in Serial No. 267,166 filed December 17, 1951, now Patent No. 2,671,158. The present drawing shows prestressed preloaded cables and shock absorbing connectors as previously disclosed in my prior applications and more fully disclosed and claimed in the present application. The bonding-layer 374 in the present Figure 13 is the bonding-layer 74 herein described. Floor slabs 310 and 312 bear on a footing beam 389 and are connected by bonding-layers 374 and prestressing cables 370 which are connected to shock absorbing connectors 380 and 381. The wall slabs 342 are similarly joined having a bonding-layer 374 therebetween at each joint horizontally and vertically and where connected to frame 314 and/or truss 375. Roof slabs 360 are likewise similarly joined. The fibrous reinforcement 377 is shown in the bonding-layer 374 in a state of tension and in this example is fiber glass fiber roving stressed by the means shown in Figure 8 herewith. Prestressing cables 370 being transversely placed to the joinery including layer 374 are also in a state of tension which is also present in the shock absorbing connectors casings. Thus an entire construction is resiliently bonded, or any portion of such a construction can be resiliently bonded together. Such a construction has reinforced joints and joinery with the plastic resin or the like, from the said joinery penetrating and permeating the precast cementitious, concrete or masonry units which plastic resin composition in the body of the said units and on its surface and in its pores being internally stressed upon polymerization whereby said stress is transmitted in compression through the interface bond area of said porous structural material and the said polymerized and cured resin composition. The concrete or the like, is strengthened by the incorporated plastic resin composition, e.g., an unsaturated polyester resin composition or an epoxy resin or epoxy-elastomeric composition, any suitable and adapted plastic resin composition, or combination of discrete resin compositions, elastomerics and rubbers or rubbery compounds.

Figure 14 is an enlarged cross-section of an embodiment of the invention and shows the features and details of a hydraulic type shock absorber connected to a prestressing cable on each side and having a bonding-layer like 74 or 374 between the units and connecting the units in the manner of the present invention. The bonding-layer is shown as an example of the packaged prepared ready-for-use on-site construction of my Patent No. 2,671,158 used in combination with the shock absorbing connector and prestressing cables of this invention.

In the present invention the feasibility of making structures highly resistant to dynamic loadings from tornado, earthquake and blast at costs which appear as practical in present needed constructions is readily apparent herein. Because of the rapid development of plastic resins and the like the picture is changing from day to day as new scientific progress in this field is made and therefore cost is a changing feature of the pattern, but generally with lower cost appearing as the new technological improvements in materials and materials engineering appear. The present invention is affected thereby and it is to be herein pointed out that any and all such improvements as come within the spirit of the disclosure in the further development of the art are included in claims of invention. The invention of particular plastic resins and fibers is not a part of the present invention but the uses of plastic resins and fibers, elastomeric materials, light-weight and fire resisting concretes, temperature resisting ceramic aggregates together with prestressing means features, obtained by thermal prestressing of materials, mechanical prestressing of materials, and physiochemical and, chemical prestressing of materials alone or in combination of either of them to make shock absorbing connectors, shock absorbing connections, and structures living under a prestressed preload, wherein the prestressing features of the system are in themselves shock absorbing systems of construction, are the considerations of the present invention.

While the method of the present invention and the materials used are particularly advantageous as applied in connection with the presently described invention and while I have described the principles of my invention and have given numerous examples of possible applications of these principles, it will be understood that the invention is not limited in its cited examples and that various modifications may be resorted to within the scope and spirit of the invention as defined by the appended claims. It is also to be understood that the term "prestressing" used throughout the specification and claims is intended to cover any and all types of prestressing including, "mechanical prestressing," "thermal prestressing," "chemical prestressing" and "physio-chemical prestressing" wherein preload forces are induced into the materials of the invention or are used as direct means of shock absorption in combination with the other features of the instant invention. Reinforcement as a term is intended to cover increased strength added to concrete or the like by impregnated, permeated and penetrated plastic resins and the like into concrete as a material as well as reinforcement derived from metallic strands, bars and wires in the conventional manner, and particularly to reinforcement derived from fiber glass and other non-metallic strands and fibers, alone and in combination with plastic resins like polyester and epoxy type resins.

I claim:

1. In a masonry structure a joint between cementitious elements, said elements being in spaced and opposed face to face relationship, each element having therein a casing, said casings being in opposed relationship and each casing having a closed end positioned remote from the face of the element and an open end communicating with the face, each casing including therein a peripheral hollow enlargement intermediate its ends, the hollow enlargements communicating with the interior of a respective casing, an elongated plunger disposed within each casing, each plunger having a first head thereon positioned adjacent to but spaced from the closed end of the respective casing, first shock absorbing means positioned between the closed ends of the casing and the first heads of the plungers, second shock absorbing means disposed within the enlargements of each casing, said second shock absorbing means engaging each plunger and resiliently maintaining it substantially centrally of the casing, a second head on each plunger positioned adjacent the open ends of a respective casing, said second heads of the plungers being joined together in articulated relationship and a layer of resilient bonding material filling the space between the opposed faces of the cementitious elements, said joined second heads of said plungers being enclosed within said layer.

2. In a masonry structure a joint between cementitious elements as claimed in claim 1, in which one joined second head is a male element and the other joined second head is a female element; said male and female elements connected together by a bolt locked in place with a cotter key therethrough.

3. A shock absorbing and energy dissipating construction for building construction, engineering constructions and the like, comprising at least one pair of porous structural members and a combination shock absorbing and energy dissipating means comprising a laminated plastic resin composition-fibrous reinforced bonding layer of resilient material which forms a joint securing said members together, an energy absorbing connector disposed within the body of each of said members, means traversing said bonding layer and interconnecting the energy absorbers in said members, said fibrous reinforcement comprised of unidirectional and multidirectional reinforcements in and of the bonding layer; said bonding layers of resilient material being bonded to the said porous structural material of said members, said bonding material having substantial penetration and permeation of portions of said porous structural members by a part of the plastic resin composition of said bonding layer; tensioned prestressing cables connected to each of said energy absorbing connector; said tensioned cable holding said porous structural material under compression; said combination means which is comprised of said laminated plastic resin layer and said fibrous reinforcements, said energy absorbing connectors and said prestressing cable together cooperatively limiting movement of said porous structural members toward and from each other under normal static loads on said joint, yieldable and permitting articulative movements but resisting displacement of one portion relative to the other under dynamic loading energy inputs upon said joint imposed from any direction.

4. A shock absorbing and energy dissipating construction as claimed in claim 3, in which said unidirectional reinforcements are comprised of fiber glass fibers and exist in said laminated layer in said joint in a prestressed preloaded state under tension.

5. A shock absorbing and energy dissipating construction as claimed in claim 3, in which said bonding layer is comprised of fiber glass and polyethylene terephthalate fibrous reinforcements embedded in a plastic composition, and in which said layer provides substantial load transfer means having damping means and shock absorbing resistances to dynamically imposed forces applied to said construction.

6. A shock absorbing and energy dissipating construction as claimed in claim 3, in which the said combination of energy absorbing means includes springs disposed in said energy absorbing connectors of said combination.

7. A shock absorbing and energy dissipating construction as claimed in claim 3, in which said combination of energy absorbing means includes at least one shock absorber means comprised of fluid type hydraulic elements articulatively operative in resilient plastic resin encasements.

8. A shock absorbing and energy dissipating construction as claimed in claim 3, in which said combination of energy absorbing means includes a core in said bonding layer comprised of a polymerized expanded plastic resin composition.

9. A shock absorbing and energy dissipating construction as claimed in claim 3, in which said construction of energy absorbing means includes in at least a portion of said laminated layer plastic resin composition an unsaturated polyester resin composition having a predetermined shrinkage in its set polymerized state.

10. A shock absorbing and energy dissipating construction as claimed in claim 3, in which said combination of energy absorbing means includes in at least a portion of said laminated layer plastic resin composition an epoxy resin composition in its set polymerized state.

11. A shock absorbing and energy dissipating construction as claimed in claim 3, in which said combination of energy absorbing means includes in at least a portion of said laminated layer plastic resin composition sisal fiber reinforcements.

12. A shock absorbing and energy dissipating construction as claimed in claim 3, in which said combination of energy absorbing means includes in said laminated composition an elastomeric resinous rubbery composition in its set and cured polymerized state.

13. A shock absorbing and energy dissipating construction as claimed in claim 3, in which said combination of energy absorbing means includes a plastic resin composition having a filler therefor adapted to absorb shock.

References Cited in the file of this patent

UNITED STATES PATENTS

| | | |
|---|---|---|
| 2,290,424 | Grund | July 21, 1942 |
| 2,308,677 | Dailey | Jan. 19, 1943 |
| 2,340,263 | Dodson | Jan. 25, 1944 |
| 2,358,328 | Heltzel | Sept. 19, 1944 |
| 2,378,801 | Sidell et al. | June 19, 1945 |
| 2,413,990 | Muntz | Jan. 7, 1947 |
| 2,572,407 | Talet et al. | Oct. 23, 1951 |
| 2,671,158 | Rubenstein | Mar. 2, 1954 |
| 2,680,370 | Spaight | June 8, 1954 |
| 2,749,266 | Eldred | June 5, 1956 |

OTHER REFERENCES

Concrete, June 1949, pages 12 and 45.